UNITED STATES PATENT OFFICE.

SÖREN PETER SÖRENSEN, OF VEILE, DENMARK, ASSIGNOR OF ONE-HALF TO PHILIP W. HEYMAN, OF COPENHAGEN, DENMARK.

CATTLE-FOOD AND PROCESS OF MAKING SAME.

SPECIFICATION forming part of Letters Patent No. 609,057, dated August 16, 1898.

Application filed December 14, 1896. Serial No. 615,694. (No specimens.)

*To all whom it may concern:*

Be it known that I, SÖREN PETER SÖRENSEN, dairyman, of Veile, in the Kingdom of Denmark, have invented certain new and useful Improvements in the Method of Producing an Artificial Food Containing Blood for Swine, Cattle, &c., of which the following is a specification.

The present invention relates to a process for making an artificial food or forage consisting of blood, molasses, grain, or bran specially intended for feeding swine and cattle, although it may also be used for feeding horses, poultry, and dogs, &c.

The process for making the forage in question is as follows:

The blood after having been collected in a receiver is strongly stirred up and simultaneously heated, during which process it receives an addition of from ten to twenty-five per cent. water.

The thin liquid is then poured through a filter into another receiver, in which the heating is continued until the temperature of the liquid has reached about 75° centigrade. In order to keep the mixture in a liquid state, an alkaline solution is added to the same during the heating process. After this the mixture receives an addition of some weak harmless acid—as, for instance, strongly-diluted acetic acid—and the heating is continued until 100° centigrade is reached. The firm particles of the blood will then be precipitated and form a comparatively solid mass that is separated from the water and urea, the latter remaining in the watery solution. In order to remove this liquid part, the mass is pressed in a press of suitable construction. The remaining solid mass after having been crushed or ground in a mill or any other suitable machine is mixed with molasses and ground grain or bran in a certain proportion, dependent on the nature of the forage wanted.

As regards the quantity of the above-mentioned alkaline solution that is added to the blood mixture during the first heating process, as also the quantity of the weak acid added later on, no precise indication can be given, as either of these substances may be used in greatly-varying proportions without the final product being materially and differently affected.

As an example may be given, that under ordinary conditions a solution of from fifty to seventy-five grams borax or bicarbonate of soda and from fifty to seventy-five grams acetic acid (of eighty per cent.) diluted with six to eight kilograms of water may be added to five hundred kilograms blood. Much greater quantities of these substances may, however, be used without materially altering the final product.

If thus, for example, to five hundred kilograms blood were added five hundred grams acetic acid diluted with water and two thousand five hundred kilograms bicarbonate of soda, the greater part of the acetic acid would be neutralized by the soda, and the final product would therefore be about the same as when using less quantities of the said substances.

By treating the blood in the manner as described above considerable advantages are secured if compared with other methods hitherto used for utilizing blood.

Thus, for instance, dirt, hair, manure, urea, &c., which cannot be prevented from being mixed with the blood, especially by the slaughtering of swine, and which substances are injurious for the health of those animals that eat the food, are by the above-mentioned process prevented from remaining in the final product, as hair and similar substances are removed from the blood when this is in a liquid state, while the urea, &c., is dissolved in the water and flows away with this. In order to make quite sure that the urea has been completely removed, the blood mass may, after pressing, be washed out with fresh water one or several times.

Through heating of the blood to about 100° centigrade the dangerous bacilli that may possibly be contained therein—for instance, the tubercle bacilli—are killed, and thus made harmless. The food in question presents, therefore, a great advantage and considerable improvement also in point of sanitation.

It must furthermore be pointed out that the heating of the blood is done in such a manner that the albumen contained therein neither loses any of its nutritive value nor becomes perfectly destroyed, which is generally the case when the blood is dried in ovens or in machines without any preliminary treatment.

Experiments made with the above-mentioned food have shown that its nutritive value is about fifty per cent. greater than that of pure barley and that the quality of the meat from animals fed with this food is first-class.

Having thus described my invention, what I claim as new, and desire to secure by Letters Patent, is—

The process of treating blood for making food which consists in a preliminary heating of the blood and dilution thereof by about ten per cent. to twenty-five per cent. of water, passing the blood thus heated and diluted through a filter to strain out foreign substances, then raising the temperature of the liquid to about 75° centigrade, adding an alkaline solution during said heating, adding acetic acid to the mixture and raising the temperature to about 100° centigrade, precipitating and separating the solid particles of the blood, and incorporating therewith molasses and ground cereal food, as set forth.

In testimony that I claim the foregoing as my invention I have signed my name in presence of two subscribing witnesses.

SÖREN PETER SÖRENSEN.

Witnesses:
L. HOFMANN BASIG,
AUG. HYMAN.